(12) United States Patent
Gabriele et al.

(10) Patent No.: US 7,594,119 B2
(45) Date of Patent: Sep. 22, 2009

(54) SYSTEM FOR MANAGING TIME RIGHTS LINKED TO A DIGITAL CONTENT

(75) Inventors: Sophie Gabriele, Fuveau (FR); William Orlando, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 797 days.

(21) Appl. No.: 10/668,795

(22) Filed: Sep. 23, 2003

(65) Prior Publication Data

US 2004/0073952 A1    Apr. 15, 2004

(30) Foreign Application Priority Data

Sep. 30, 2002    (FR)    .................................. 02 12052

(51) Int. Cl.
*H04L 9/00*    (2006.01)
(52) U.S. Cl. ....................... 713/180; 713/191; 713/193; 380/28; 380/201
(58) Field of Classification Search .................. 713/180
See application file for complete search history.

(56) References Cited

U.S. PATENT DOCUMENTS

| | | | |
|---|---|---|---|
| 4,741,048 A | 4/1988 | Mori | |
| 4,949,394 A | 8/1990 | Shiraishi et al. | |
| 5,070,400 A | 12/1991 | Lieberman | |
| 5,825,876 A | 10/1998 | Peterson, Jr. | |
| 5,857,020 A * | 1/1999 | Peterson, Jr. | 705/52 |
| 5,857,024 A * | 1/1999 | Nishino et al. | 713/172 |
| 7,039,811 B2 * | 5/2006 | Ito | 713/185 |
| 7,058,607 B1 * | 6/2006 | Miyawaki et al. | 705/52 |
| 7,113,926 B1 * | 9/2006 | Suzuki | 705/52 |
| 7,134,144 B2 * | 11/2006 | McKune | 726/26 |
| 7,165,174 B1 * | 1/2007 | Ginter et al. | 713/153 |
| 7,174,320 B2 * | 2/2007 | Rothrock | 705/58 |

OTHER PUBLICATIONS

French Search Report from French Patent Application No. 02/12052, filed Sep. 30, 2002.

* cited by examiner

*Primary Examiner*—Emmanuel L Moise
*Assistant Examiner*—Shewaye Gelagay
(74) *Attorney, Agent, or Firm*—Lisa K. Jorgenson; James H. Morris; Wolf, Greenfield & Sacks, P.C.

(57) ABSTRACT

A system for detecting the time exceeding conditions of at least one application being executed by a processor, including: an element for storing time conditions, the conditions being sorted by increasing deadline order; a register for storing the condition closest to the current date; and a comparator of the deadline contained in the register with the current date of the system.

10 Claims, 1 Drawing Sheet

SYSTEM FOR MANAGING TIME RIGHTS LINKED TO A DIGITAL CONTENT

BACKGROUND OF THE INVENTION

1. Field of the Invention

The present invention generally relates to systems for managing rights of use of digital contents. There are basically two types of rights. A first type of rights relates to rights linked to conditions of numbers of uses. A second type of rights relates to time conditions linked, for example, to the use or availability times. The present invention more specifically relates to the managing of rights of use linked to time conditions. This concerns, for example, conditions of duration of each use of the digital content or conditions of cumulated duration of use of this content.

2. Discussion of the Related Art

Among examples of application of the present invention, are the managing of rights of use of video files, music files (MP3), radio or broadcasting files, etc. The rights of use or exploitation of the content managed by a system with time conditions are most often the direct rights of use, that is, the listening times of an audio digital file or the viewing time of a video sequence. Other rights of exploitation such as copy, transfer, or printing of digital data are generally managed by systems linked to number conditions rather than to time conditions. It is however not excluded for certain right management systems to use time (calendar) conditions to set a period of time during which the person entitled to the rights is allowed to copy, loan, transfer, or print the digital content.

The control of the time use conditions sets a specific problem, which is that the validity of these conditions must be verified all along the use of the digital content, which introduces an additional calculation load for the equipment exploiting the content (for example, a microcomputer, a digital television, an MP3 walkman).

FIG. 1 very schematically and partially illustrates, in the form of blocks, an example of a conventional circuit for managing time rights of a digital content. In this example, an application (block 1, APPLi) formed for example of a video file which must be processed by a digital processor 2 (PROC) and to which are associated time use conditions is considered. The time use conditions form, for example, a deadline (including date and time) of use of the video file. In a system such as illustrated in FIG. 1, the time condition to be verified is input into work register 3 (RT) which is periodically read from by a comparator 4 (COMP) and is compared to the current date (TIME) issued by processor 2 and calculated based on its clock CLK. In case the deadline is exceeded, comparator 4 generates an interrupt IT for the processor.

The simplified operation described hereabove well illustrates the constraint of periodic verification of the time condition to be verified.

Although such a constraint remains acceptable in the case of a single application to be monitored, it becomes frequent for systems of digital content exploitation (for example, computers) to simultaneously exploit several time conditions of a same digital content and/or several distinct digital contents, the respect time conditions of which must periodically be verified.

In such a case, this multiplies the time processor is occupied in order to carry out time condition verifications.

SUMMARY OF THE INVENTION

The present invention aims at providing a novel system for managing rights of digital contents for validating time use conditions, which frees the digital content execution processor from the load of the actual verification.

The present invention also aims at providing a solution which uses little cycle time of the execution processor.

The present invention also aims at providing a solution which is particularly simple to implement and compatible with existing digital systems.

To achieve these and other objects, the present invention provides a system for detecting the exceeding of time conditions of at least one application being executed by a processor, comprising:

an element for storing the time conditions, said conditions being sorted by increasing deadline order;

a register for storing the condition closest to the current date; and a comparator of the deadline contained in said register with the current date of the system.

According to an embodiment of the present invention, a timer calculates the current date of the system, this timer being separate from a counter used by the application-processing processor.

According to an embodiment of the present invention, said storage element contains, with each stored time condition, an identifier of the concerned application.

According to an embodiment of the present invention, said storage element contains, with each time condition, an identifier of a monitored type of event.

The present invention also provides a system for managing rights of use of a digital content linked to at least one time condition.

The present invention also provides a method for controlling a system for detecting the exceeding of time conditions comprising, upon each execution of a new application, inputting the corresponding time condition into said storage element in its place in the deadline order; and updating said register if the new time condition is the closest to the current date.

According to an embodiment of the present invention, at each stopping of an application being executed:

the storage element is updated by the deleting of the time condition from the concerned application; and said register is updated if the deleted time condition has the closest deadline.

According to an embodiment of the present invention, an interrupt for the processor is generated each time said comparator detects an exceeding of the time condition stored in said register by the current date.

The foregoing objects, features and advantages of the present invention, will be discussed in detail in the following non-limiting description of specific embodiments in connection with the accompanying drawings.

DETAILED DESCRIPTION

Figure 1:
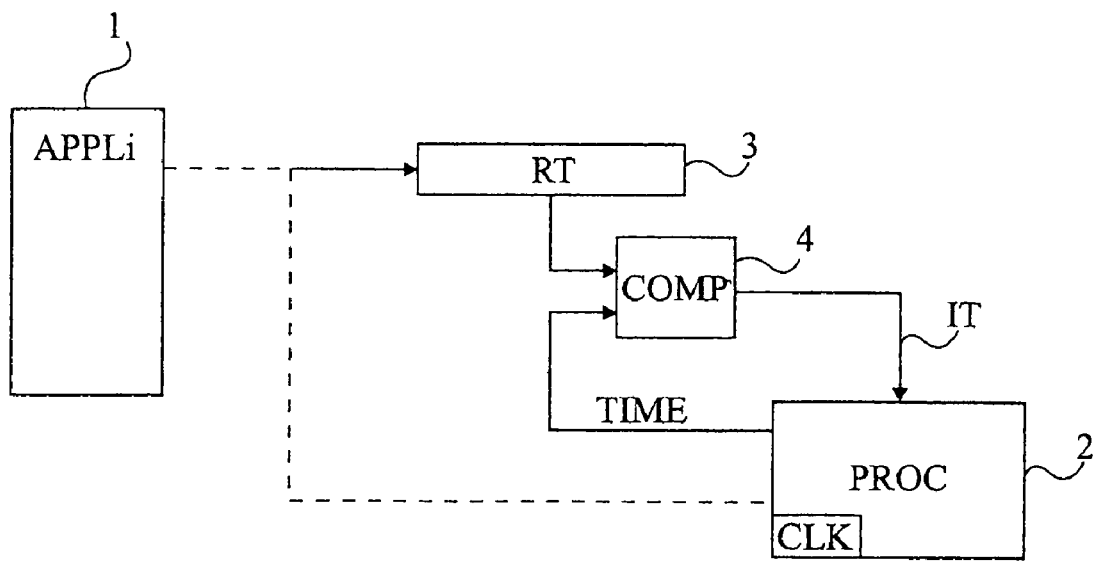
FIG. 1, previously described, partially and schematically shows an example of a conventional system for managing use time conditions of digital contents.

The same elements have been designated with the same reference numerals in the different drawings. For clarity, only those steps and functions that are necessary to the understanding of the present invention have been shown in the drawings and will be described hereafter. In particular, the applications (digital contents) managed by the system of the present invention have not been described in detail. The present invention applies whatever the type of the managed digital content, provided that a time condition is to be managed.

A feature of the present invention is to provide a previous chronological sorting of the time conditions to be simultaneously monitored by the same system. Thus, the present invention provides storing, in a storage element, a table of successive time conditions to be fulfilled.

Another feature of the present invention is to only provide the periodic verification of the closest time condition, since the other subsequent time conditions cannot be exceeded as long as the first one is not.

Figure 2:
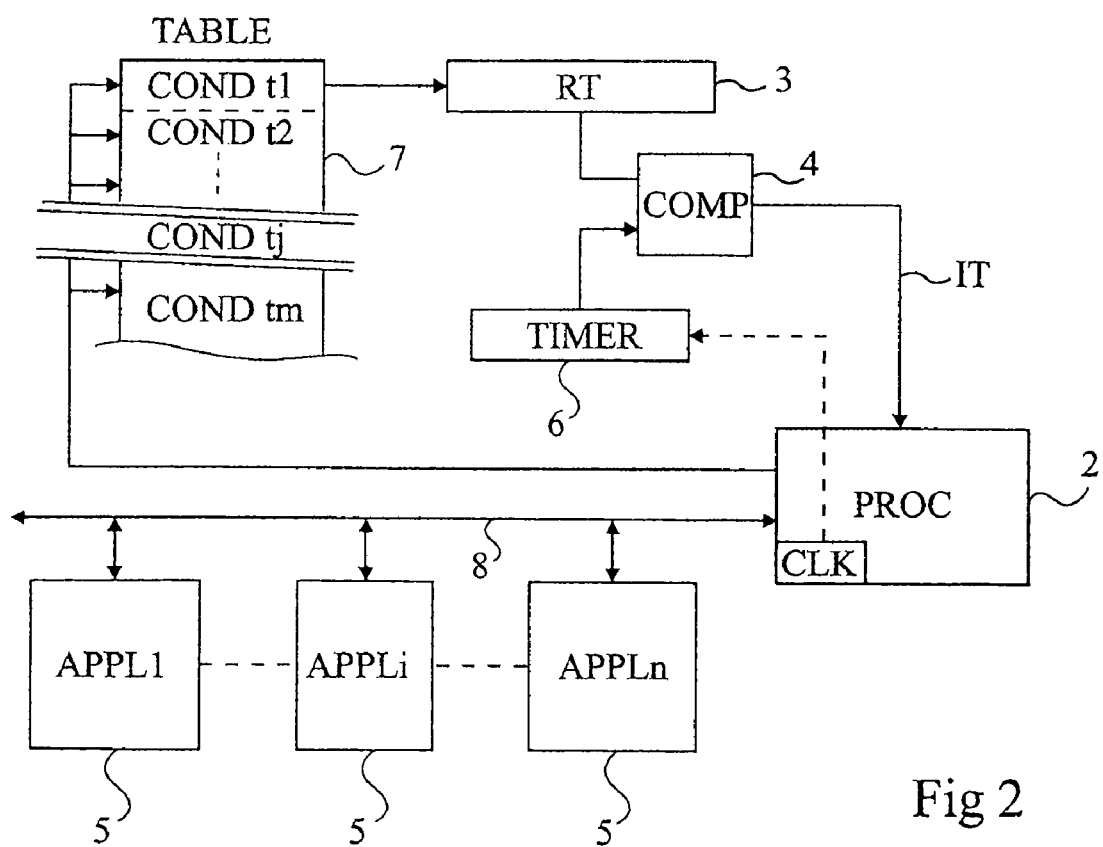
FIG. 2 schematically and partially shows an embodiment of a system for managing use time conditions of digital contents according to the present invention.

FIG. 2 partially and schematically shows in the form of blocks an embodiment of a system for managing rights of exploitation of a digital content linked to time conditions according to the present invention. In fact, this is a system for detecting the exceeding of at least one time condition of an application being executed by a digital system.

As previously, one or several applications APPL1, . . . APPLi, . . . APPLn (blocks 5) are capable of being executed by a processor 2 (PROC). Generally, "application" is used to designate any program or circuit of use or execution of a digital content. For example, it may be a program for reading from a video or audio file or more generally any computer program for which use time conditions have been set. These conditions are generally set by the licensing party which conditions, either the total duration of use of the digital content, or the period for which this content may be used. The different applications 5 communicate with processor 2, for example, by means of a bus 8.

According to the present invention, a timer is used, only output register 6 of which has been shown. This timer provides the current date and hour for comparison with a closer time condition. Output register 6 of the timer is sent onto an input of a time comparator 4 (COMP), the output of which provides an interrupt IT to processor 2 in case the current date (date and hour) has exceeded a deadline temporarily stored in a work register 3 (RT).

The content of work register 3 is modified at each beginning of the execution of a new application or at the end of the execution of an application being executed. The content of work register 3 corresponds to the date closest to the current date, among a set of m time conditions CONDT1, CONDT2, . . . CONDTj, . . . CONDTm assigned to the respective applications being executed and stored in a look-up table 7.

In FIG. 2, two different indexes i and j have been used to designate application APPL and the attached time condition CONDT, to, enhance the fact that the order in which the time conditions are stored in table 7 is not necessarily the same as the numbering order of the applications which may correspond, for example, to their order of appearance in the system for execution.

Processor 2 organizes the storage of the different time conditions CONDTj in table 7 as the corresponding applications appear. According to a preferred embodiment, the chronological organization in table 7 is performed upon storage under control of processor 2.

Preferably, the counter of the current date exploits clock CLK of the system symbolized by a block in processor 2, but is a timer separate from that managing the execution of the applications by the processor. The latter is thus freed to the maximum from the task of monitoring the time conditions.

Although not shown in FIG. 2, different control and synchronization signals are present and have not been detailed to avoid uselessly overloading the drawing. In particular, the periodic comparisons require a clock signal.

According to the present invention, the system manages all of the time conditions (for example, by being implemented in the form of an execution program by processor 2). This comprises the following functions.

Upon each addition of a new time condition, be it the introduction of a new application or of a new digital content into the system or a time condition proceeding from an application being executed (for example, a second time limit for restricted rights of use), processor 2 triggers the introduction of time condition CONDTj into table 7 at the right place in the chronological classification of this table. Further, for the case where this new time condition is the first one in the chronological order, the processor then updates work register 3 so that it becomes the first time condition to be monitored.

In analogous fashion, each suppression of a time condition, for example due to the stopping of an application executed by the system (for example, the user presses on the STOP key of a video reader), processor 2 suppresses from the list stored in table 7 the corresponding time condition and, for the case when this condition would correspond to that being monitored, replaces the content of the work register with the next condition in the table.

Each time comparator 4 generates an interrupt because a time condition has been reached, work register 3 is updated by the introduction of the next time condition of table 7. Each time an interrupt appears due to the exceeding of a time condition, it is necessarily known that this interrupt concerns the first time condition in the list stored in table 7.

According to a preferred embodiment of the present invention, the content of each recording of table 7 contains not only time condition CONDTj, but also the identifier of the corresponding application APPLi as well as, preferentially, the type of the monitored right (reading, recording, loan time, etc.). The knowing of the application identifier enables immediately pointing on the tool (for example, the CDROM reader) which uses the monitored medium. The knowing of the type of monitored right enables deciding which action to take, according to the condition.

The managing of the actual interrupt corresponds to conventional managements following up the exceeding of a time condition.

According to a first embodiment of the present invention, the interrupt is directly interpreted by central processor 2 of the system, which acts upon the application.

According to a second embodiment, processor 2 transmits to the application identified by the recording of table 7 the involved type of right, to enable for this application to manage the exceeded time condition. In this case, it is the program linked to the application which contains the actual time right management program. This embodiment relates, for example, to the case of a cumulative counter of the consumption (or of the use of an application) stored in this very application. Said application must then be able to update its consumption counter based on the use time calculated by the system of the present invention.

To optimize the time right management system and prevent a possible piracy, that is, a possible fraud attempt on the monitored rights, the program of time right management and more specifically of organization of the storage in table 7 preferentially executes in so-called secured fashion in the computer system. Further, the updatings of clock CLK of the system are secured so that, in normal operation, no modification of the internal clock is possible, which guarantees that the current date contained in counter 6 is not falsified.

An advantage of the present invention is that it considerably improves the performances of a system for managing rights linked to time conditions.

Another advantage of the present invention is that it is a versatile solution which can be implemented in any digital system, whatever the number of digital contents of which the time exploitation conditions are desired to be monitored.

Of course, the present invention is likely to have various alterations, modifications, and improvement which will readily occur to those skilled in the art. In particular, the time condition comparison periodicity depends on the application and on the desired security level and is not modified by the implementation of the present invention with respect to conventionally-made choices. Further, the organization of the storing of the recordings linked to the time conditions, to the application identifiers, and to the monitored types is within the abilities of those skilled in the art based on the functional indications given hereabove. The storage of the time condition table will be preferentially performed in a memory which is not accessible to be modified by the user.

Further, although the present invention has been described hereabove using a vocabulary more specifically dedicated to a software implementation of the time condition management program, it may also be implemented in hardware form by a state machine in wired logic, especially if the maximum number of time conditions to be monitored is limited.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A system for detecting time exceeding conditions of at least one application executed by a processor, comprising:
   a storage element for storing a plurality of time conditions associated with rights of use of the at least one application, wherein the plurality of time conditions are stored as sorted in a chronological order;
   a work register for storing a time condition from the plurality of time conditions closest to a current date of the system; and
   a comparator for comparing the time condition stored in the work register with the current date of the system and, when the current date of the system exceeds the time condition:
      providing an interrupt to the processor; and
      updating the work register by introducing to the work register a next time condition from the plurality of time conditions stored in the storage element, wherein the next time condition is next closest to the current date.

2. The system of claim 1, further comprising a timer for calculating the current date of the system, said timer being separate from a counter used by the processor.

3. The system of claim 1, wherein said storage element contains, with each stored time condition, an identifier of an application with which the time condition is associated.

4. The system of claim 1, wherein said storage element contains, with each time condition, an identifier of a monitored type of event.

5. A system for managing rights of use of at least one digital content executed by a processor and linked to at least one time condition from a plurality of time conditions, the system comprising:
   a storage element for storing the plurality of time conditions associated with the rights of use of the at least one digital content, wherein the plurality of time conditions are stored as sorted in a chronological order;
   a work register for storing a time condition from the plurality of time conditions closest to a current date of the system; and
   a comparator for comparing the time condition stored in the work register with the current date of the system and, when the current date of the system exceeds the time condition;
      providing an interrupt to the processor; and
      updating the work register by introducing to the work register a next time condition from the plurality of time conditions stored in the storage element, wherein the next time condition is next closest to the current date.

6. A method for detecting an exceeding of time conditions of at least one application executed by a processor, comprising:
   storing a plurality of time conditions associated with rights of use of at least one application in a storage element, wherein the plurality of time conditions are stored as sorted in a chronological order;
   storing a time condition from the plurality of time conditions closest to a current date in a work register;
   comparing a deadline of the time condition stored in the work register with the current date to determine if the current date exceeds the time condition; and
   when it is determined that the current date exceeds the time condition:
      providing an interrupt to the processor; and
      updating the work register by introducing to the work register a next time condition from the plurality of time conditions stored in the storage element, wherein the next time condition is next closest to the current date.

7. The method of claim 6 comprising, upon each execution of a new application:
   inputting a new time condition corresponding to the new application into said storage element so as to maintain storing the time conditions in said storage element in the chronological order; and
   updating the work register by introducing to the work register the new time condition if the new time condition is the closest to the current date.

8. The method of claim 6, comprising, at each stop of the at least one application being executed:
   updating the storage element by deleting a time condition corresponding to the at least one application; and
   updating the work register if the deleted time condition is closest to the current date by placing in the work register a next time condition from the plurality of time conditions stored in the storage element.

9. The method of claim 6 further comprising storing, in the storage element, for a time condition, an identifier for an application with which the time condition is associated.

10. The system of claim 5, wherein the storage element stores an identifier of a type of the rights of use of the at least one digital content, the identifier is associated with each time condition from the at least one time condition linked to the rights of use of the at least one digital content.

* * * * *

UNITED STATES PATENT AND TRADEMARK OFFICE
CERTIFICATE OF CORRECTION

PATENT NO.           : 7,594,119 B2
APPLICATION NO. : 10/668795
DATED                    : September 22, 2009
INVENTOR(S)         : Sophie Gabriele et al.

It is certified that error appears in the above-identified patent and that said Letters Patent is hereby corrected as shown below:

Claim 1, col. 5, line 35 should read:
A system for detecting an exceeding of time conditions of at Signed and Sealed this Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO.       : 7,594,119 B2
APPLICATION NO.  : 10/668795
DATED            : September 22, 2009
INVENTOR(S)      : Gabriele et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Twenty-eighth Day of September, 2010

David J. Kappos
*Director of the United States Patent and Trademark Office*